Oct. 29, 1946.    G. K. C. HARDESTY    2,410,064
ILLUMINATED DIAL AND POINTER
Filed July 17, 1943         4 Sheets-Sheet 1

Inventor.
GEORGE K.C. HARDESTY

By
Attorney

Oct. 29, 1946.   G. K. C. HARDESTY   2,410,064
ILLUMINATED DIAL AND POINTER
Filed July 17, 1943   4 Sheets-Sheet 2
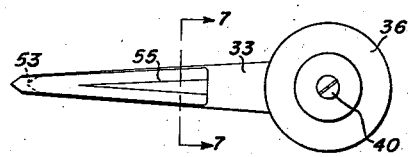
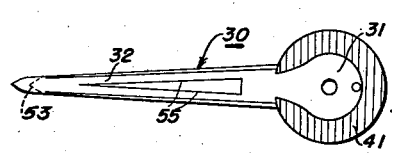
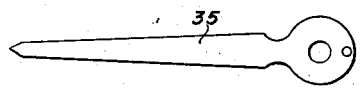
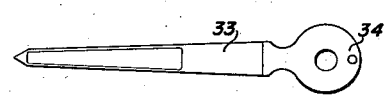
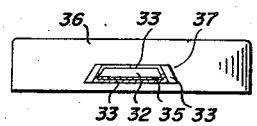
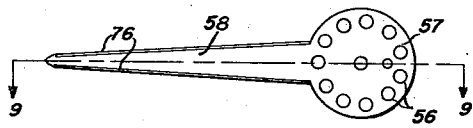
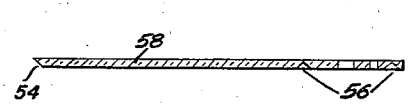
Inventor
GEORGE K.C. HARDESTY
By
*Attorney*

Oct. 29, 1946.　　G. K. C. HARDESTY　　2,410,064
ILLUMINATED DIAL AND POINTER
Filed July 17, 1943　　4 Sheets-Sheet 3
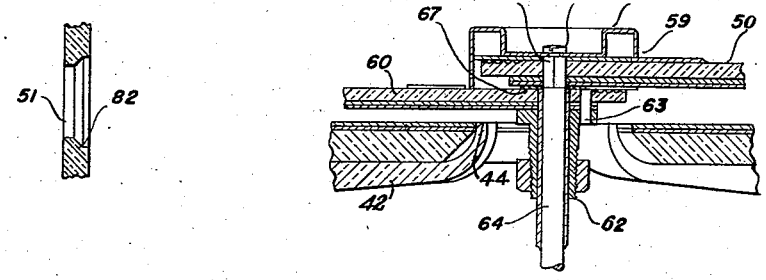
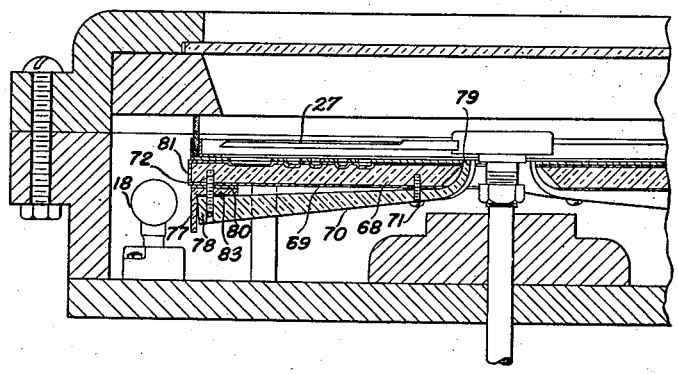
Inventor
GEORGE K. C. HARDESTY
By　*P. T. Bush*
　　　Attorney Oct. 29, 1946.    G. K. C. HARDESTY    2,410,064
ILLUMINATED DIAL AND POINTER
Filed July 17, 1943    4 Sheets-Sheet 4

Inventor
GEORGE K.C. HARDESTY
By
Attorney

Patented Oct. 29, 1946

2,410,064

UNITED STATES PATENT OFFICE 2,410,064

ILLUMINATED DIAL AND POINTER

George K. C. Hardesty, Seat Pleasant, Md.

Application July 17, 1943, Serial No. 495,219

12 Claims. (Cl. 116—129)

(Granted under the act of March 3, 1883, as amended April 30, 1928; 370 O. G. 757)

The present invention relates in general to improvements in the illumination of indicating instruments and in particular to the illumination of the dials and the pointers of instruments that must be observed at night under conditions where it is most desirable to avoid disturbance of the observer's darkness adaptability as where such instruments are situated before the pilot of a ship or airplane.

It has been found that under such conditions, the use of colored light illumination, at present believed to be red against a black or darkened background and without glare, is much less disturbing to an observer's darkness adaptability than other colors, especially blue, which is a component of white light, while the contrast between other colors and particularly between white and black, is found to be more readily discernible by day light illumination under conditions where brightly lighted objects beyond the instruments must be under substantially constant observation by the user of the instruments.

An important object of the invention is the provision of a combined dial and pointer capable of being evenly illuminated at night by red light illumination of a readily perceptible but moderate intensity and against a substantially black or non-illuminated background and in which the illumination is applied to only essential indicia to be observed such as the graduations on a dial and a pointer movable over the dial and to provide as well for good day light visibility, preferably by white light reflection.

Another object is to provide for an even illumination throughout substantially the entire area of an indicium with equal illumination of the different indicia around the dial so that the observer will not be detracted from a reading at one portion of the dial by the presence of brighter portions elsewhere on the dial.

Another object is the provision of a rotary pointer structure capable of artificial illumination with minimum variation in intensity of illumination throughout a complete rotation of the pointer.

Another object is the provision of a pointer having a relatively small area capable of colored light illumination under surrounding darkness while offering illumination of a larger area by reflected daylight or other outside source of illumination.

Another object is the provision of a combined dial and pointer in which the light emitted by small lamps such as are commonly used in instrument illumination is utilized in a manner so efficient that the use of color filters with the resulting reduction of available radiant energy is possible without reducing the illumination below useful intensities.

A further object is the provision of a combined dial and pointer in which the above objects are attained with a construction occupying minimum space around and back of the dial and capable of replacing the dial and pointer of an existing instrument with minimum or no change in the structure of the instrument and without interference with the usual operation of the latter.

Various other objects and advantages of the invention will become apparent from a perusal of the following specification and the drawings accompanying the same.

In the drawings:

Fig. 3 is a plan view of the assembled pointer structure.

Fig. 4 is a plan view of the transparent pointer element.

Fig. 5 is a plan view of a reflector element.

Fig. 6 is a plan view of the casing or light-shield element.

Fig. 7 is a section on the line 7—7 of Fig. 3 on an enlarged scale.

Fig. 8 is a plan view of a modified form of the transparent pointer element.

Fig. 9 is a section on the line 9—9 of Fig. 8.

Fig. 10 is a section on the line 10—10 of Fig. 1.

Fig. 11 is an axial, cross sectional view of a pair of superposed pointers for concentric shaft drive.

Fig. 12 is a fragmentary axial cross sectional view of a modification adapted to back-illumination.

Figure 1:
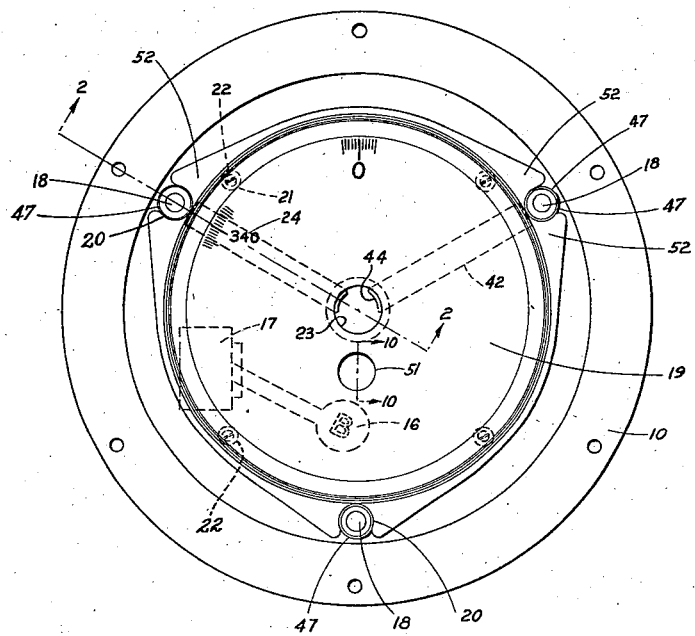
Fig. 1 is a plan view of an instrument with the cover removed showing the improved dial and pointer structure installed therein, the filter covers being also removed.

Referring to the drawings in detail and first to Figs. 1 to 7, the invention is here shown as applied to a known general form of R. P. M. repeater indicator with a back-signal target. Such an instrument usually comprises the main casing 10, having a cover element 11 with bezel 12 and glass window 13. Within the casing is mounted the usual drive shaft 14 entering through a suitable bearing 15, together with a back-signal target 16 and operating mechanism 17 therefore, and a plurality of electric lamps 18 situated around the side walls for illumination of the dial and pointer. Usually illumination of the dial is effected by means of reflectors and light channels arranged to direct the light around over the edge of the dial and onto its face. The present invention is concerned with an improved dial and pointer assemblage for instruments of the general structure above described, the new dial and pointer structure being adapted to make use of the existing or slightly modified arrangement of lamps for its illumination.

In the present instance the improved combination dial and pointer is constructed for use with an instrument having three lamps disposed symmetrically within the casing near the side walls as shown in Fig. 1. The dial 19 is in the form of a plate of colorless transparent material such as an acrylic resin of substantial thickness, the present embodiment being of a thickness in the order of one-quarter of an inch, and is provided with a plurality of re-entrant, input edge portions 20 each located to receive one of the lamps 18. Dial-supporting studs 21 mounted on the base of the case 10 support the dial through means of suitable cap screws 22 in a position to center the central opening 23 of the dial in axial alignment with the drive shaft 14 of the instrument. A combined reinforcing ring and light-seal holder 73 is secured to the face of the dial near the periphery and carries a light-seal ring 74 of felt or other suitable material secured to the ring 73 by a retaining ring 75, and proportioned in height to bear against the cover of the casing around the window opening so as to form a light-seal between the edge of the dial and the window opening. The dial is provided with intaglio indicia 24 such as graduations and numerals distributed in the usual manner around or near the periphery of the dial, such indicia being rendered capable of illumination to the exclusion of the background by any known or other suitable treatment of the dial rendering the background substantially opaque and the indicia translucent so as to be illuminated by light distributed through the body of the dial by internal reflection. Preferably the dial is engraved and then uniformly sprayed with a translucent coating 25. Afterwards the face of the dial is coated with black paint or printer's ink 26 applied by rolling in order to avoid coating the engraved or intaglio indicia. The dial is then baked at a low temperature to harden the black coating.

Figure 2:
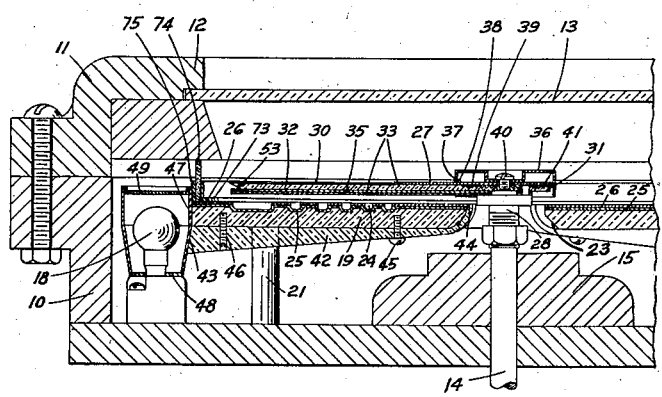
Fig. 2 is a section on the line 2—2 of Fig. 1.
Figure 16:
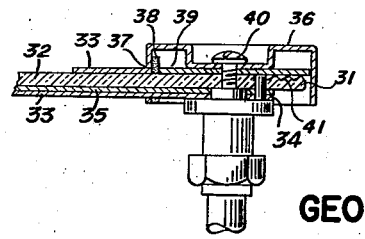
Fig. 16 is an enlarged detail view of the hub portion of the pointer assemblage of Fig. 2.

The pointer structure 27 is comprised of a pointer element 30 of transparent, clear colorless material, preferably a plastic such as acrylic resin having polished surfaces and contoured as indicated in Fig. 4 to form a hub portion 31 and a pointer arm-portion 32. A thin metal casing 33 reinforces and partially shields the pointer element, covering a portion of the top of the pointer arm near the hub and substantially the entire bottom and sides of the pointer arm and provided with a hub portion 34 (Fig. 6) of a diameter smaller than the diameter of the hub 31 of the pointer. This leaves a wide margin between the periphery of the hub portion 34 of the casing (Fig. 6) and the periphery of the hub of the transparent pointer element (Fig. 8). Interposed between the pointer element 32 and the bottom of the casing 33 is a reflecting element 35 of thin white plastic material such as white Celluloid. The pointer with its casing 33 and bottom reflector element 35 is provided with a hub cap 36 housing the hub portion 31 of the transparent pointer element, the arm portion 32, together with the casing 33 and reflector element 35, projecting through an opening 37 in the hub cap which opening is sealed by a suitable light-seal in the form of a felt washer 38. A second light-reflecting element 39 similar to the reflector 35 but in the form of a thin disc and also of opaque white reflecting material is interposed between the surface of the hub portion 31 and the hub cover 36. It is to be noted here that while the transparent pointer element 30, reflectors 35 and 39, casing 33, and hub-cap 36 are firmly secured together to form a sturdy unit assemblage, the contact between the reflectors and the transparent pointer element is sufficiently imperfect to avoid optical contact with the latter. The term optical contact as herein used is intended to indicate any contact or juncture between the surface of a transparent body and another element that will substantially impair internal reflection, particularly the quality of total reflection. By avoidance of such contact along the bottom of the pointer arm, the reflector can receive and interfere with the internal reflection of but a minimum of light being transmitted through the interior of the transparent pointer element with the result that under surrounding darkness, the arm will be only faintly illuminated by light transmitted through the pointer, while in daylight, light entering the arm portion of the pointer transversely to the plane of the dial and therefore not subject to internal total reflection, reaches the reflector and is reflected back to show a full illumination of substantially the entire exposed area of the pointer arm. Through the use of the reflector element 39 out of optical contact with the hub, total reflection is assured wherever the light strikes the surface of the hub at an angle equal to or greater than the critical angle, while light penetrating the surface will in large part be reflected back into the hub. The pointer structure thus assembled is mounted on a shaft coupler element 28 in axial alignment with the shaft 14 and opening 23 of the dial by means of a suitable cap screw 40 passed through the hub cap 36 and threaded into the upper end of the coupler. With the parts thus mounted as shown in Figs. 2 and 16, the hub portion 31 of the transparent pointer element is positioned to extend across the dial opening 23 beyond the peripheral margin of the coupler element 28 and hub portions of the casing 33 and reflector 35, so as to receive light directed outwardly through the dial opening 23. To enable such light to be transmitted radially outwardly through the pointer element by internal reflection, one of the surfaces of the hub portion of the transparent pointer is corrugated as indicated at 41 in a direction substantially normal to the direction of extension of the pointer arm 32, an arrangement which has been found to produce very satisfactory distribution of light into the arm portion of the pointer element with substantially little or no variation in intensity throughout a complete revolution of the pointer with respect to the points of light-input to the hub. In the present instance which is illustrative of a practical embodiment of the invention, the transparent pointer element has a length of nearly three and one half inches with a thickness of approximately one sixteenth of an inch, which thickness is found to be sufficient for ample illumination of the pointer when constructed as herein disclosed.

Light is supplied to the hub of the pointer element by means of a pair of wedge-shaped light conducting bars 42 of colorless transparent material such as acrylic resin arranged to extend radially inwardly along back of the dial from two of the lamps 18 into the dial opening 23 to terminate at their output ends in close proximity to the lower face of the hub 31. Each of these light conducting bars 42 is, of course, polished at its input and output ends 43 and 44, respectively, to enhance the transmission of light therethrough and is also highly polished along all side surfaces to bring their internal reflection to a maximum. For similar reasons, the input edges 20 of the dial 19 and the lower face of the dial are polished. The conducting rods 42 are secured to the dial mechanically by means of suitable screws such as 45 passed through the bar and threaded into the dial, the bar being held in proper radial alignment by a pin 46 secured in the dial. This mechanical connection affords a sturdy and compact unitary assemblage of dial and conducting bars while avoiding optical contact between the adjacent polished surfaces of the conducting bars and dial thus preserving the full effects of internal reflection in these two members. The tapering of the conducting bars 42 from the input edge 43 to the emitting end 44 as shown has been found to effect a substantial concentration of light at the emitting end whereby the reduction in area necessary to fit the emitting ends into the space between the coupler element 26 and the sides of the dial opening 23 may be made without loss of efficiency.

Edge illumination of the dial and conducting rods 42 by colored light is effected through the use of filter elements 47 interposed between the lamps 18 and the input edges 20 and 43 of the dial and conducting rods respectively such filter elements being of general cylindrical form so as to surround the lamps 18 and fit snugly within the reentrant input edge portions 20 of the dial and against the edge portions 43 of the conducting rods. Where desired, improved optical connection between the filter and the input edges of the dial and conducting rods may be obtained in any known or other suitable manner as by use of an intervening transparent substance such as a transparent cement. To complete a sealing of the lamp 18 against escape of unfiltered light directly from the lamp into the casing or side portions of the conducting rods, the cylindrical filter element 47 is provided with a felt light-sealing washer 48 at the bottom and at the top with a cover element 49 preferably of opaque material or of a transparent or translucent material of substantially the same color as the filter element. The dial and pointer are thus provided with red light illumination from a common source and through colorless light-transmitting channels, assuring a substantial uniformity of shade of color. By providing the light conducting bars 42 with the narrow arc-shaped output ends 44 extending into the dial opening and around a substantial arc in the opening as shown in Fig. 1, and providing the hub of the transparent pointer element with the transverse corrugations as above described, two such light conducting bars 42 have been found to be sufficient to effect an ample and substantially uniform illumination of the pointer structure throughout a complete revolution of the pointer. The arrangement of the conducting bars at an angle of considerably less than 180° enables the bars to be mounted clear of a large portion of the space within the instrument case, assuring against interference with other apparatus elements of the instrument such as the backing signal device 16—17, or other auxiliary indicating device such as an odometer-type counter to be observed through the aperture 51 in the dial.

Colored light from the lamp 18 is transmitted through the filter 47 and the input edge surface 20 of the dial 19 in lines substantially normal to the surfaces of the filter and the reentrant input edge 20. This light entering the dial is dispersed throughout the interior of the dial by internal reflection effecting an even illumination of substantially the entire surface of each indicium and substantially equal illumination of the several indicia distributed around the peripheral margin of the dial. Heretofore, it has been practically impossible to obtain a high degree of perfection in uniformity of illumination throughout the entire area of each indicium or of equal illumination of substantially the entire zone occupied by the indicia, due to internal shadows cast by the opening in the dial, and the fact that some portions of the indicia are nearer to the light source than others. It has been found that through the use of the reentrant input surfaces 20 and the portions 52 of the dial extending slightly beyond the general circular contour of the dial, the portions 52 and the remainder of the outside edges being roughened to receive light from the lamps by internal transmission and act as a source of diffused light, there is obtained an even distribution of illumination, from various angles, of that portion of the dial containing the indicium and in a manner which avoids the casting of shadows by the dial openings 23 and 51. This results in an even illumination of substantially the entire surface of each indicium element by light rays from various angles with substantial equal illumination of all of the indicia around the dial.

Red light from the source 18 is also transmitted into the conducting bar 42 by way of the filter element 47 and through the conducting bar by internal reflection to the hub portion 31 of the pointer, corrugations 41 acting to direct a large portion of the light in the direction of the pointer arm 32 and along the interior thereof by internal reflection. The reflector element 35 at the bottom of the pointer arm is substantially ineffective to catch and reflect light from the interior of the pointer arm due to the fact that optical contact is avoided. However, during daylight illumination, light rays from outside entering through the outer surface of the arm of the transparent pointer element will be received and reflected back by the reflector element 35. To render the end of the pointer element readily perceptible at night without the illumination of unduly large areas, the tip or end portion of the pointer arm as indicated in Fig. 4, may be provided with a reflecting element in the form of a layer of paint 53 on the beveled, bottom, tip end of the pointer arm in optical contact with the arm so as to receive and reflect light from the interior thereof. This reflecting element consists preferably of a coating of white paint and it is to be understood that it may also be provided by any other reflecting means in optical contact with the arm or by a roughening or breaking of the surface, or by the provision of a beveled, polished surface forming a prismatic reflector for directing the light up and out of the tip of the pointer as indicated at 54 in Fig. 9. It is also to be noted here that the reflectors 35 and 39 instead of being constituted of separate thin sheets of reflecting material, may be simply a coating of white paint on the inner surfaces of the pointer casing 33 and hub cap 36. To further render the pointer visible particularly as to the angle of its position with a minimum illuminated area, a thin line illumination of the arm is obtained through the provision of engraved lines such as those indicated at 55 in Figs. 3 and 4 extending along the bottom of the transparent pointer element, to receive and reflect a portion of the internally reflected light in the pointer.

From the above, it will be seen that under night illumination, only the essential indicia are illuminated such as the graduations and numerals on the dial, the end of the pointer and the engraved lines extending along the pointer with some very faint illumination of the remaining exposed portion of the pointer arm. The light sources 18 with their surrounding filters 47 being positioned at the edge of the dial, supply very little light to the interior of the casing and that which does enter is sufficiently diffused not to detract from the evenness of illumination of the indicia on the dial. Any undesirable back illumination may be obviated by the use of a suitable opaque coating on parts of the filter hood not in the path of rays from the lamp to the input edges of the dial and light-conducting bar. For illuminating the back-signal target disc 16, the edges of the aperture 51 are provided with a beveled surface 82 flared toward the back of the dial to direct some of the light from the interior of the dial inwardly of the casing in the neighborhood of the aperture 51 whereby any object situated close to and back of the aperture such as the target 16 or other indicating means such as an odometer will be illuminated and readily visible through the aperture.

A modified form of the transparent pointer element shown in Figs. 8 and 9 is substantially of the same general structure as that of Fig. 4 except that it utilizes a plurality of conical reentrant portions 56 in one of the faces of the hub portion 57, for directing light into the arm portion 58. An angularly disposed, polished surface 54 at the end of the pointer directs light outwardly therefrom, giving the effect of a point of light at the end of the pointer. Frosted or otherwise roughened, beveled edge portions 76 produce an edge illumination of the pointer arm.

The flat form of the transparent element as here disclosed renders it readily adaptable to use in a pair of superposed pointers with separate concentric driving shafts as in clock-hand arrangement. Such an arrangement is illustrated in cross section in Fig. 11. Here the uppermost pointer assembly 59 is similar to that of the pointer structure 27 of Fig. 2 and is shown mounted above a lower pointer structure 60 similar to the former except for the omission of a hub cover such as the hub cover 61 of the upper pointer structure, the one hub cover serving for both. Here the lower pointer is fixed to an outer-shaft coupling element 62 by means of a key pin 63 extending into the hub portion of the pointer, while the upper pointer 50 is connected with the inner driving shaft 64 through the squared-end portion 65, the two pointers being held down in assembled relation by the cap screw 66. A thin spacer-washer 67 is provided to maintain slight spacing between the two pointers to avoid rubbing contact with the upper face of the hub portion of the lower transparent pointer element. It will be clear from the drawing that part of the light directed upwardly to the hub of the lower transparent pointer element from the light emitting ends 44 of the conducting bars 42, passing into the hub of the lower element will be directed into the arm portion by the corrugations at the top of the hub, while part will continue upwardly into the hub of the upper pointer to be directed into the arm of that pointer by the corrugations at the top of its hub.

In the utilization of a back illuminated dial, the construction is modified as shown in Figs. 12 to 15 where the dial 68 may be of any form capable of back illumination, preferably of a construction as to the formation of the indicia like that of the dial previously described and of the same material except that the material is colored. Here the lamps 18 remain distributed about the casing as in the previously described arrangement, but without the surrounding filters 47, and a substantially even illumination of the dial is obtained by coating the back and edge surfaces with a translucent white lacquer or the like 69 and by coating with a suitable white paint substantially all the inside surfaces of the casing and such portions of any elements contained therein as may be so coated without interference with their operation. This causes light reflected from the bottom and side surfaces of the casing to be diffused into the dial through the bottom and edge surfaces of the dial plate. The light conducting bars 70, only one of which is shown in Fig. 12, are like those of Figs. 1 and 2, formed of colorless transparent material and polished on all sides. Each bar 70 is secured to the dial plate 68 by means of a screw 71 and held in alignment by the pin 72 fixed in the dial plate.

Figure 13:
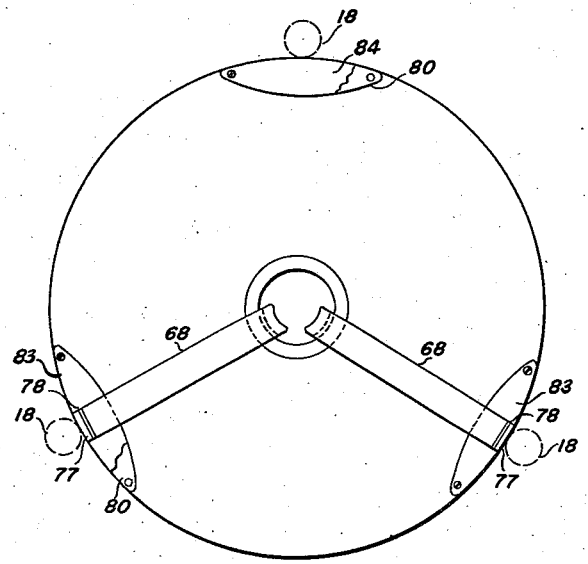
Fig. 13 is a bottom plan view of the dial and attached accessories of Fig. 12.
Figure 14:
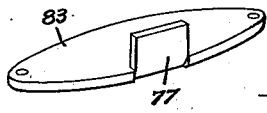
Fig. 14 is a perspective view of one of the filter elements.
Figure 15:
Fig. 15 is a perspective view of one of the diffusing pads.

The pointer structure 27 is the same as that of Fig. 1 and red light illumination of it is obtained by the use of a filter 77 of red transparent material mounted on the bottom of the dial by means of an integral base portion 82 to overlie the input edge 78 of the bar 70 between the bar and the lamp 18 so as to permit only red light to enter the light conducting bar. Light then entering the bar 70 will be conducted on through by internal reflection and emitted at the emitting end 79 into the pointer 27 in a manner as previously described in connection with Figs. 1 and 2. To avoid excess illumination of the dial at parts near the lamps, suitable light absorbing and diffusing pads 80 preferably of thin white Celluloid or the like are interposed between the supporting bases 83 of the filters 77 and the dial, while the edge portions of the dial near these places are shielded with a black or opaque coating 81. In the vicinity of a lamp where no conducting bar and filter are used as shown at the top of Fig. 13, the diffusing pad 80 is covered by a plate 84 of the same material and of the same dimensions as the base elements 83 for the sake of uniformity in structure and lighting.

It will be evident that in both the modification using the edge illuminated dial and the one using the back illuminated dial, the invention provides a dial and pointer structure adapted to be illuminated by light sources located close to the outer edges of the dial, the complete structure being sufficiently shallow in over all thickness to be readily adaptable to use with various types of indicating instruments without substantial modification of the usual structure of such instruments, or to be substituted for the dial in an existing instrument with minimum alteration of the latter.

While certain specific embodiments of the invention have been herein described for the sake of disclosure, it is to be understood that the invention is not limited to such specific embodiments but contemplates all such modifications and variants thereof as fall fairly within the scope of the appended claims.

The invention described herein may be manufactured and used by or for the Government of the United States of America for governmental purposes without the payment of any royalties thereon or therefor.

I claim:

1. An illuminated pointer structure for use with a dial comprising, a pointer of transparent material having a hub portion, means for directing light into the hub portion from the rear of the dial, a substantially opaque light shield covering the front portion and not the rear of said hub, and a reflecting element situated between the shield and the hub and substantially wholly out of optical contact with the hub.

2. An illuminated pointer structure for use with a dial comprising, a pointer of transparent material having a hub portion, means for directing light into the hub portion from the rear of the dial, a substantially opaque light shield covering the front portion and not the rear of said hub and extending along the bottom surface of said pointer, a light reflecting element situated between the shield and the hub substantially wholly out of optical contact with said hub, and a light reflecting element situated between the shield and the lower surface of the pointer and substantially wholly out of optical contact therewith.

3. An illuminated pointer structure for use with a dial comprising, a pointer of transparent material having a hub portion pivotally mounted in axial alignment with said opening, means for directing light into the hub portion from the rear of the dial, a substantially opaque light shield covering the front portion and not the rear of said hub and extending along the bottom surface of said pointer, a light reflecting element situated between the shield and the hub substantially wholly out of optical contact with said hub, and a light reflecting element situated between the shield and the lower surface of the pointer and substantially wholly out of optical contact therewith, together with a reflecting surface element in optical contact with the pointer near the pointing-end thereof.

4. An illuminated pointer structure for use with a dial comprising, a pointer of substantially colorless transparent material pivotally mounted for movement over the dial, a substantially colorless reflector extending along the rear face of the pointer and substantially wholly out of optical contact therewith, and means for directing a beam of colored light along the pointer by internal reflection whereby the reflector will readily receive and reflect daylight illumination passing transversely through the transparent pointer and will receive a relatively small portion of the colored light.

5. An illuminated pointer structure for use with a dial comprising, a pointer of substantially colorless transparent material pivotally mounted for movement over the dial, a substantially colorless reflector extending along the rear face of the pointer and substantially wholly out of optical contact therewith, and means for directing a beam of colored light along the pointer by internal reflection whereby the reflector will readily receive and reflect daylight illumination passing transversely through the transparent pointer and will receive a relatively small portion of the colored light, together with a substantially white reflecting element having an area several times smaller than that of said first mentioned reflector and in optical contact with the pointer for receiving a portion of said internally reflected light.

6. An illuminated pointer structure for use with a dial comprising, a pointer of substantially colorless transparent material pivotally mounted for movement over the dial, a substantially colorless reflector extending along the rear face of the pointer and substantially wholly out of optical contact therewith, and means for directing a beam of colored light along the pointer by internal reflection whereby the reflector will readily receive and reflect daylight illumination passing transversely through the transparent pointer and will receive a relatively small portion of the colored light, together with a prismatic reflector formed at the end of the pointer integrally therewith.

7. An illuminated pointer structure for use with a dial comprising, a pointer of transparent material having a hub portion and a pointer arm, means for directing light from back of the dial into the hub and a substantially opaque light-reflecting shield structure extending over the hub and under the pointer arm out of optical contact with said hub and pointer arm.

8. An illuminated pointer structure for use with a dial comprising, a pointer of transparent material having a hub portion and a pointer arm, means for directing light from back of the dial into the hub, a substantially opaque light shield extending over an outside portion of the hub, and a substantially opaque light-reflector extending under the pointer arm out of optical contact therewith.

9. An illuminable pointer comprising a substantially transparent pointer element of colorless, transparent material having the greater portion of its front and rear surface polished to enhance transmission of light therewithin by internal reflection, a reflecting element extending along a relatively large portion of the back surface of the pointer out of optical contact therewith and means extending over a relatively small area of the pointer for directing light outwardly from the interior of the pointer, whereby said relatively large portion over which said reflecting element extends will be illuminated by outside illumination and substantially only said relatively small area will be illuminated by light transmitted through the pointer by internal reflection.

10. An illuminable multiple pointer comprising a pair of pointer elements each constituted of a piece of substantially flat transparent material and mounted one above the other at their pivoted ends so that light transmitted axially through the pivoted end of the lower one will pass on into the upper one, each element being provided with surface irregularities near its pivoted end to direct a portion of the light into the outer end of the pointer element, and a reflector element extending over the top surface of the pivoted end of the upper pointer element and out of optical contact therewith.

11. A combined dial and pointer illuminating system comprising a light source, a dial body of transparent material having a light-admitting, edge surface-portion, and a light-conducting rod for conducting light to a pointer-hub, having a light-admitting surface portion, said dial-body and rod being secured together as a unit with their light-admitting surface portions juxtaposed and presented substantially normal to the light rays emanating from said source.

12. An illuminated pointer structure comprising a pointer of transparent material having a hub portion with substantially flat end faces and an arm portion extending radially from the hub, said hub portion having separate depressed portions angularly spaced around the hub to afford light-passages between them, and means for directing a beam of light into the hub.

GEORGE K. C. HARDESTY.